United States Patent
Pandit et al.

(10) Patent No.: US 10,123,360 B2
(45) Date of Patent: Nov. 6, 2018

(54) SYSTEM AND METHOD FOR SECURE WIRELESS COMMUNICATION

(71) Applicant: RELIANCE JIO INFOCOMM LIMITED, Mumbai (IN)

(72) Inventors: Vijeth Pandit, Bangalore (IN); Pratap Singh, Harrow (GB); Nagappan Arunachalam, Palo Alto, CA (US); Yogendra Patel, Greenford (GB); Valliappan Letchumanan, London (GB)

(73) Assignee: Reliance Jio Infocomm Limited

( * ) Notice: Subject to any disclaimer, the term of this patent is extended or adjusted under 35 U.S.C. 154(b) by 147 days.

(21) Appl. No.: 15/112,941

(22) PCT Filed: Jan. 21, 2015

(86) PCT No.: PCT/IB2015/050451
§ 371 (c)(1),
(2) Date: Jul. 20, 2016

(87) PCT Pub. No.: WO2015/110960
PCT Pub. Date: Jul. 30, 2015

(65) Prior Publication Data
US 2016/0338117 A1    Nov. 17, 2016

(30) Foreign Application Priority Data

Jan. 22, 2014  (IN) .......................... 227/MUM/2014

(51) Int. Cl.
*H04W 76/02*     (2009.01)
*H04L 29/08*     (2006.01)
(Continued)

(52) U.S. Cl.
CPC .......... *H04W 76/021* (2013.01); *H04H 20/38* (2013.01); *H04L 67/1095* (2013.01);
(Continued)

(58) Field of Classification Search
CPC .......... G06F 21/10; G06F 21/57; G06F 21/35; G06F 17/30864; G06F 21/32;
(Continued)

(56) References Cited

U.S. PATENT DOCUMENTS 5,991,429 A * 11/1999 Coffin ................ G06K 9/00255
                                                     382/118
7,382,260 B2    6/2008 Agarwal et al.
(Continued)

FOREIGN PATENT DOCUMENTS

EP    1179244 A1    2/2002
RU    2421811 C2    6/2011
(Continued)

OTHER PUBLICATIONS

The International Search report issued by Indian Patent Office dated Jun. 22, 2015 for International patent application No. PCT/IB2015/050451.

(Continued)

*Primary Examiner* — Jung Liu
(74) *Attorney, Agent, or Firm* — Jackson Walker LLP; Christopher J. Rourk

(57) ABSTRACT

A system and method for secure wireless communication for transferring or sharing data between at least two devices over a wireless network. A set of pictures are displayed on a source device from which a picture is selected either manually by a user or automatically by the system. Information related to the selected picture is transmitted to a target device. A set of pictures are displayed on the target device. On the target device, a particular picture is selected either manually by a user of the target device or automatically by the system, and further transmitted back to the source device. At the source device, the picture received from the target device is matched with the selected picture (Continued)

Figure 1:
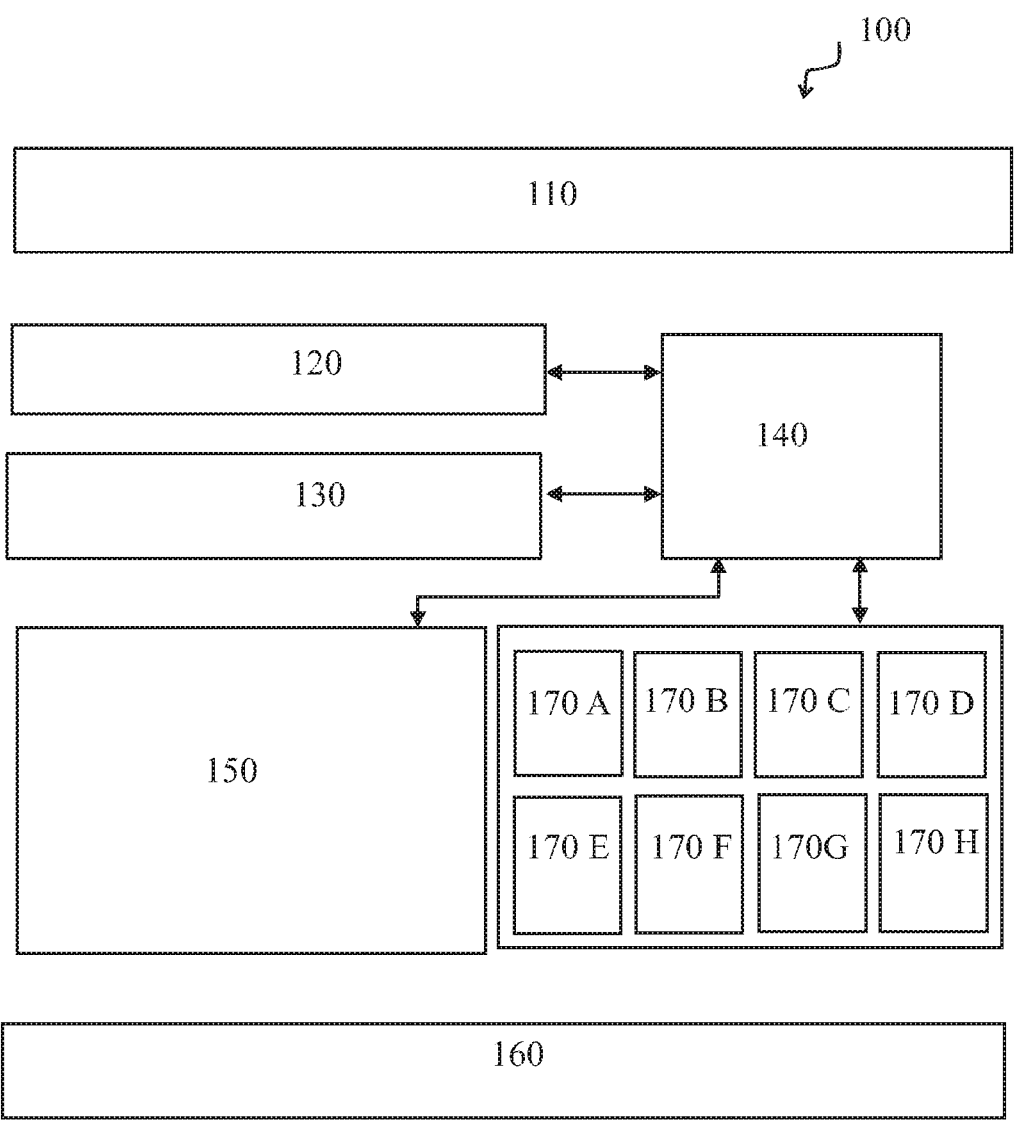

previously transmitted by the source device. Upon a successful match, the source device transmits an authentication confirmation for pairing the source device and the target device and enables data transfer.

20 Claims, 3 Drawing Sheets

(51) Int. Cl.
| | |
|---|---|
| H04W 12/06 | (2009.01) |
| H04H 20/38 | (2008.01) |
| H04L 29/06 | (2006.01) |
| H04W 4/80 | (2018.01) |
| H04W 76/11 | (2018.01) |

(52) U.S. Cl.
CPC ............... *H04L 69/22* (2013.01); *H04W 4/80* (2018.02); *H04W 12/06* (2013.01); *H04W 76/11* (2018.02)

(58) Field of Classification Search
CPC ................. G06F 21/34; H04L 63/0861; H04L 2463/082; H04L 63/102; H04L 63/0823; H04L 63/0428; H04L 63/0421; H04W 74/00; H04W 12/02; H04W 12/06; H04W 8/26; G06K 9/0002; G06K 9/00771; G06K 2209/09; G06K 9/00221; G06K 9/00973; G07C 9/00087; G07C 1/20; G07C 9/00158; G07C 9/00166; G07C 2011/02; G06Q 10/02; G06Q 10/087; G06Q 20/4014; G06Q 20/367; G06Q 30/06; G08B 25/016; G08B 13/02; G08B 13/19656; G08B 13/19691; G08B 25/14; G08B 13/1965; G08B 13/19682; G08B 13/19671

See application file for complete search history.

(56) References Cited

U.S. PATENT DOCUMENTS

| | | | |
|---|---|---|---|
| 7,401,131 B2 | 7/2008 | Robertson et al. | |
| 7,496,360 B2 | 2/2009 | Sindhwani et al. | |
| 7,701,341 B2 | 4/2010 | Kumar et al. | |
| 7,774,485 B2 | 8/2010 | Patrick et al. | |
| 7,822,860 B2 | 10/2010 | Brown et al. | |
| 7,944,355 B2 | 5/2011 | Kumar et al. | |
| 8,170,212 B2 | 5/2012 | Pering et al. | |
| 8,195,152 B1 | 6/2012 | Edwards | |
| 8,265,594 B2 | 9/2012 | Davis et al. | |
| 2003/0033369 A1 | 2/2003 | Bernhard | |
| 2004/0098306 A1 | 5/2004 | Fitzpatrick et al. | |
| 2005/0044058 A1 | 2/2005 | Matthews et al. | |
| 2005/0050301 A1 | 3/2005 | Whittle et al. | |
| 2006/0020904 A1 | 1/2006 | Aaltonen et al. | |
| 2007/0239819 A1 | 10/2007 | Woods et al. | |
| 2008/0287062 A1 | 11/2008 | Claus et al. | |
| 2009/0183247 A1* | 7/2009 | Kasper | H04L 63/0861 726/7 |
| 2009/0228820 A1 | 9/2009 | Kim et al. | |
| 2010/0049874 A1 | 2/2010 | Chene et al. | |
| 2010/0111377 A1* | 5/2010 | Monroe | G06K 9/00221 382/118 |
| 2011/0038512 A1* | 2/2011 | Petrou | G06F 17/30256 382/118 |
| 2011/0069823 A1* | 3/2011 | Chen | H04M 1/27455 379/88.19 |
| 2011/0219427 A1* | 9/2011 | Hito | G06F 21/00 726/3 |
| 2012/0174093 A1 | 7/2012 | Davila et al. | |
| 2013/0033611 A1* | 2/2013 | Chen | G06F 17/30247 348/207.1 |
| 2013/0136316 A1* | 5/2013 | Grassel | G06K 9/00677 382/115 |
| 2013/0219263 A1 | 8/2013 | Abrahami | |
| 2015/0026330 A1* | 1/2015 | Ahmed | G06F 21/73 709/224 |
| 2015/0109428 A1* | 4/2015 | Mechaley, Jr. | G06K 9/00288 348/77 |
| 2016/0342784 A1* | 11/2016 | Beveridge | H04L 67/08 |

FOREIGN PATENT DOCUMENTS

| | | |
|---|---|---|
| WO | 2008001064 A1 | 1/2008 |
| WO | 2013061156 A2 | 5/2013 |

OTHER PUBLICATIONS

Scott et al., "Using visual tags to bypass bluetooth device discovery", Mobile Computing and Communication Review, 2005, vol. 1, No. 2, pp. 1-12.

The International Search report and the Written opinion issued by European Patent Office dated Oct. 20, 2016 for the International Patent Application No. PCT/US2016/044842.

Miller, "Facing the Challenge of Wireless Security", Computer, 2002, pp. 16-18, vol. m34, No. 7.

The International Search report and the Written opinion issued by Russian Federal Institute of Industrial Property Office dated Sep. 19, 2013 for the International Patent Application No. PCT/US2013/046640.

The International Search report and the Written opinion issued by USPTO dated Sep. 30, 2015 for the International Patent Application No. PCT/US2015/038683.

The International Search report and the Written opinion issued by EPO dated Dec. 3, 2015 for the International Patent Application No. PCT/US2015/050276.

GSM Association, "VoLTE Service Description and Implementation Guidelines, Version 1.1", www.gsma.com/network2020/wp-com, Mar. 26, 2014, pp. 1-121.

Anonymous et al., "FRITZ!Box 6842 LTE: Der Alleskönner mlt Voice-over-LTE", www.lte-anbieter.info/lte-news/fritzbox-6842-lte-der-alleskonner-mit-voice-over-lte, Feb. 27, 2013, pp. 1.

AVM GMBH, "FRITZ!Box 6842 LTE Einrichten und bedienen", img.billiger.de/dynimg/ h5r90H8yeGyX90aFpmTDmHt4H9rycHjeBa9LTdXG2DA41-ZtYq5vi031VpqWBj4_HexpdHaC1z88YR5bxwk6-U/ Bedienungsanleitung.pdf, May 1, 2014, pp. 1-212.

\* cited by examiner

SYSTEM AND METHOD FOR SECURE WIRELESS COMMUNICATION

The present application is a 35 U.S.C. 371(c) National Stage Application of International Application No. PCT/IB2015/050451, filed on Jan. 21, 2015, which in turn claims priority under 35 U.S.C. § 119(a) to Indian Application No. 227/MUM/2014, filed on Jan. 22, 2014, each of which are incorporated herein by reference in its entirety.

FIELD OF DISCLOSURE

The present disclosure relates to wireless communication.

DEFINITIONS OF TERMS USED IN THE SPECIFICATION

The expression 'device' used hereinafter in the specification refers to but is not limited to mobile phones, smartphones, laptops, tablets, desktops, iPads, PDAs, notebooks, net books, and the like.

The expression 'framework' used hereinafter in the specification refers to but is not limited to the products or services supporting interoperability among connectable terminals and dynamic proximal networks.

The expression 'connecting medium' used hereinafter in the specification refers to but is not limited to Bluetooth, WiFi, WiFi access point, WiFi Hotspot, LAN, WAN, MAN, and other user defined wired or wireless networks.

The above definitions are in addition to those expressed in the art.

BACKGROUND

Pairing communication devices is a technology wherein two devices establish a communication link amongst themselves. Bluetooth, which represents one of such technologies, is a wireless protocol which exchanges data over short distances. Bluetooth helps simultaneously connect up to eight devices. Operating at a frequency of about 2.45 gigahertz, Bluetooth works with weak signals of 1 milli-watt as compared to 3 watts for cellphone communication. This is largely responsible for limiting the range for Bluetooth communication to 10 meters (32 feet). Bluetooth uses a technique called spread spectrum frequency hopping that makes it rare for more than one device to be transmitting on the same frequency at the same time. A typical Bluetooth communication protocol follows the following procedure. Multiple devices, which are connected, are kept within the specified range, the process referred to as 'Discovering'. A source device which wishes to establish a connection with a target device, generates an authentication code also known as the 'Passkey'. The source device sends the passkey to the target device, which a user of the target device then enters when prompted. Once the passkey is entered and authenticated, the devices are linked and are ready to exchange data.

Bluetooth based systems create a personal area network (PAN), or piconet, that may fill a room or may encompass no more distance than that between a device such as a mobile phone on a belt-clip of a user and a headset worn over the head of the user. Once a piconet is established, the devices randomly hop frequencies in unison so they stay in touch with one another and avoid other piconet networks that might be operating close by.

However, there are many drawbacks associated with the Bluetooth communication technology and protocol. A major drawback is that of device discovery. Since Bluetooth based data transfer is distance specific, problems with regards to the devices not being identified in a discoverable area are quite common Another problem is that of the passkey. Bluetooth protocol requires that both the sender and the receiver of the passkey be able to accurately generate and replicate the passkey on both the source and target devices. This is a highly challenging task and often leads to errors. Often, despite being connected, the devices are not able to transfer data. This problem is attributed to the low signal strength.

There have been several endeavors to solve some of these problems. For example, WO2008001064 attempts to solve the problem related to passkey generation, transfer and inputting. The solution involves introducing the Bluetooth address details to contacts database of a device. When a connection needs to be established, the address is retrieved from the contacts database and immediately followed by sending communication data packets. While the solution does take care of the some of the problems associated with connecting via passkeys, the problems with short range, connection problems and low power data transfers still persist.

Reference article 'Scott, D., Sharp, R., Madhavapeddy, A.,and Upton, E. 2005. Using visual tags to bypass bluetooth device discovery, Mobile Computing and Communications Review, 1,2,1-12.', attempts to solve the problem associated with the passkeys generation, transfer and inputting. The solution involves use of camera phones to capture visual tags which decode to transfer the Bluetooth address of the target device(s). While this point and shoot approach eliminates the need to generate passkeys, the problems with regards to short range, connection problems and low power data transfers still persist.

Hence there is felt a need for a protocol and technology which will address the aforementioned problems and enable secure and efficient wireless communication.

OBJECTS

Some of the objects of the present disclosure aimed to ameliorate one or more problems of the prior art or to at least provide a useful alternative are listed herein below.

An object of the present disclosure is to provide a system for secure wireless communication which is easy to install and easy to operate.

Another object of the present disclosure is to provide a system for secure wireless communication which requires considerably less time to perform its operation.

Yet another object of the present disclosure is to provide a method for secure wireless communication which could be performed by people of all age groups.

Another object of the present disclosure is to provide a system and method for secure wireless communication which is reliable.

Still another object of the present disclosure is to provide a system and method for secure wireless communication which can be universally applied across different platforms and different operating systems.

An additional object of the present disclosure is to provide a system for secure wireless communication which works across different makes of devices.

Another object of the present disclosure is to provide a system and method for secure wireless communication which experiences minimum errors.

Yet another object of the present disclosure is to provide a system for secure wireless communication which consumes less power and fewer resources.

Another object of the present disclosure is to provide a method for secure wireless communication which can be performed by people with medical conditions.

An additional object of the present disclosure is to provide a method for secure wireless communication which can be performed by people with illiteracy and/or language barriers.

Still another object of the present disclosure is to provide a system for secure wireless communication over large operating distances.

Another object of the present disclosure is to provide a system for secure wireless communication which works on portable and non-portable devices.

A further object of the present disclosure is to provide a system for secure wireless communication which can perform its functions with minimal human interaction.

Additionally, another object of the present disclosure is to provide a system for secure wireless communication which can operate across multiple devices.

Other objects and advantages of the present disclosure will be more apparent from the following description when read in conjunction with the accompanying figures, which are not intended to limit the scope of the present disclosure.

SUMMARY

In accordance with an aspect of the disclosure, there is provided a method for secure wireless communication, the method comprising the following steps:
  establishing connection of a source device to a wireless network through a framework and establishing connection of at least one target device to the wireless network through the framework;
  broadcasting a universally unique identifier (UUID) of the source device and universally unique identifier's (UUIDs) of such target device(s) on the wireless network through the framework;
  searching for UUIDs of a plurality of devices including the UUIDs of such target device(s) on the wireless network in the vicinity of the source device through the framework;
  displaying the UUIDs of the plurality of devices on the wireless network in the vicinity of the source device on a display unit of the source device;
  establishing connection between the source device and such target device(s) on the wireless network through the framework, in the event that such target device(s) is in the vicinity of the source device;
  loading a plurality of pictures from an external memory into a memory of the source device;
  representing a file name of each picture as an identification of each picture;
  displaying the plurality of pictures on the display unit of the source device;
  selecting at least one picture from the displayed pictures at the source device;
  transmitting a handshaking packet comprising the plurality of pictures including the picture selected at the source device, an identification of each picture, and the universally unique identifier (UUID) of the source device, from the source device to such target device(s) over the wireless network through the framework;
  receiving the handshaking packet at such target device(s);
  extracting the plurality of pictures from the handshaking packet and displaying the pictures on a display unit of such target device(s);
  selecting at least one picture from the displayed pictures at each target device;
  transmitting a handshaking packet comprising at least an identification of the picture selected at each target device from each target device to the source device over the wireless network through the framework;
  receiving at the source device, the identification of the picture selected at each target device;
  comparing the identification of the picture selected at the source device with the identification of the picture selected at each target device; including:
    authenticating such target device(s) in the event that the identification of the picture selected at the source device matches with the identification of the picture selected at such target device(s); or
    rejecting such target device(s) in the event that the identification of the picture selected at the source wireless device does not match with the identification of the picture selected at such target device(s);
  transferring data between the source device and such target device(s) over the network in the event that the authentication is successful.

Typically, the method further comprises the step of storing the identification of the selected picture into the memory of the source device, after the step of selecting at least one picture from the displayed pictures at the source device.

Typically, the method further comprises the step of storing the identification of the selected picture into a memory of each target device after the step of selecting at least one picture from the displayed pictures at each target device.

Additionally, the step of authenticating such target device(s) in the event that the identification of the picture selected at the source device matches with the identification of the picture selected at such target device(s), includes the steps of:
  transmitting a message from the source device informing such target device(s) of successful authentication;
  receiving at such target device(s) the message of successful authentication.

Additionally, the step of rejecting such target device(s) in the event that the identification of the picture selected at the source device does not match with the identification of the picture selected at such target device(s), includes the steps of:
  transmitting a message from the source device informing such target device(s) of failed authentication;
  receiving at such target device(s) the message of failed authentication and disconnecting such target device(s) from the source device;
  awaiting authentication at such target device(s) and displaying a message indicative of the awaited authentication on the display unit of such target device(s).

Typically, the method further comprises the steps of:
  disconnecting such target device(s) from the source device in the event of not receiving the message of either successful authentication or failed authentication at such target device(s) within a pre-determined time period;
  awaiting authentication at such target device(s) and displaying a message indicative of the awaited authentication on the display unit of such target device(s).

In accordance with another aspect of the disclosure, there is provided a system for secure wireless communication, the system comprising:
  a framework adapted to establish connection of a source device and target device to a wireless network, the framework adapted to enable wireless communication of the source device and the target device over the wireless network, the framework being implemented in the source device by a first processor of the source device and in the target device by a second processor of the target device;

a data replication manager implemented by the first processor of the source device and the second processor of the target device, the data replication manager adapted to store a plurality of pictures into a memory of the source device and a memory of the target device;

a user interface adapted to provide access to the system, the user interface implemented on a display unit of the source device by the processor and a display unit of the target device by the second processor, the user interface further adapted to enable a user of the source device to select at least one picture from the plurality of pictures from the memory of the source device and a user of the target device to select at least one picture from the plurality of pictures from the memory of the target device;

a picture pairing manager implemented by the first processor of the source device and the second processor of the target device, the picture pairing manager cooperating with the user interface and the framework for wirelessly transmitting and receiving at least a handshaking packet comprising the plurality of pictures including the selected picture between the source device and the target device over the wireless network through the framework;

a replication engine implemented by the first processor of the source device and the second processor of the target device, the replication engine cooperating with the picture pairing manager and the data replication manager, the replication engine adapted to convert the plurality of pictures of the handshaking packet into a data format suitable for transmission; and a replication client implemented by the first processor of the source device and the second processor of the target device, the replication client cooperating with the picture pairing manager for re-converting the data format of the received handshaking packet into a plurality pictures suitable for viewing on the display unit of the source device and the display unit of the target device.

BRIEF DESCRIPTION OF THE ACCOMPANYING DRAWINGS

Figure 2:
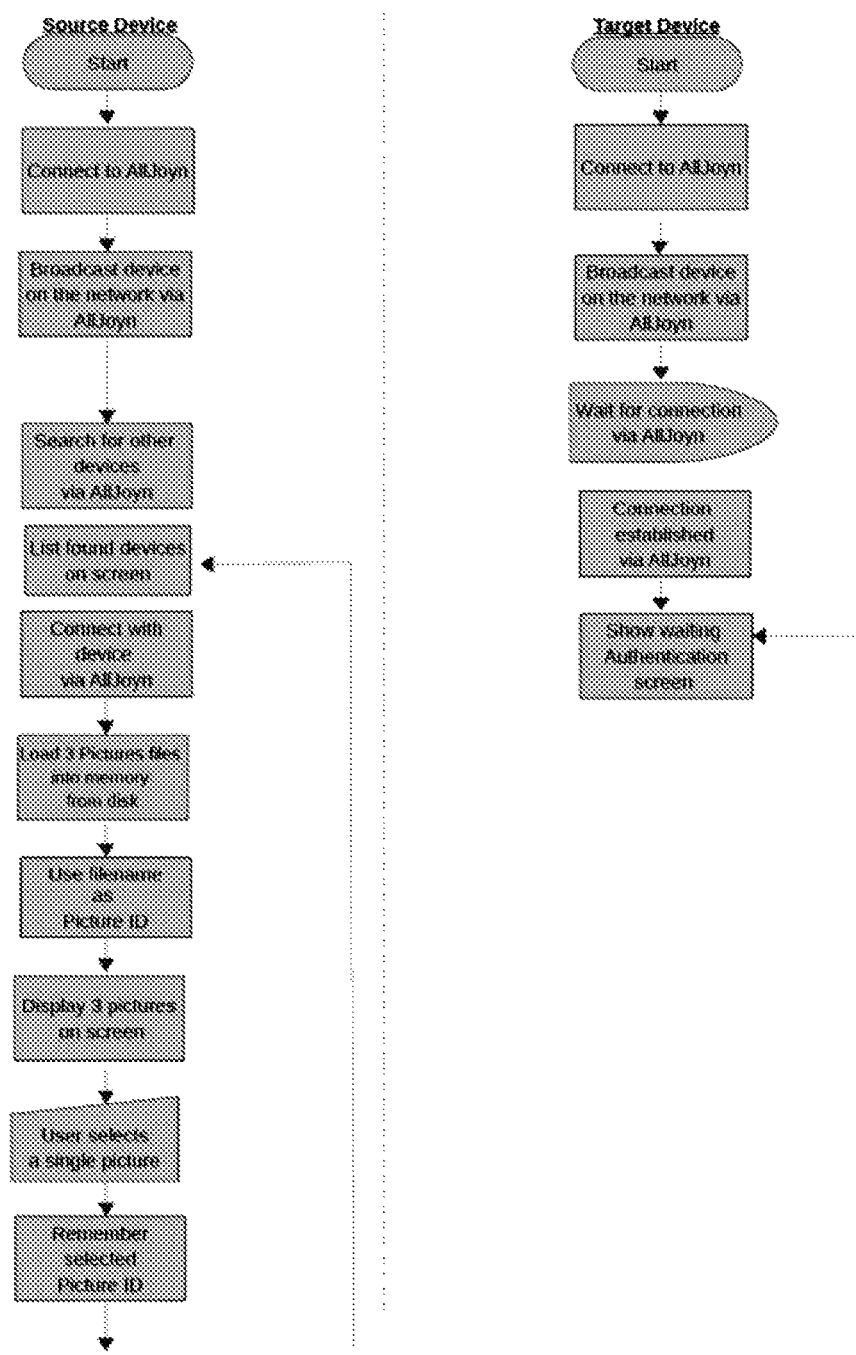
Figure 2B:
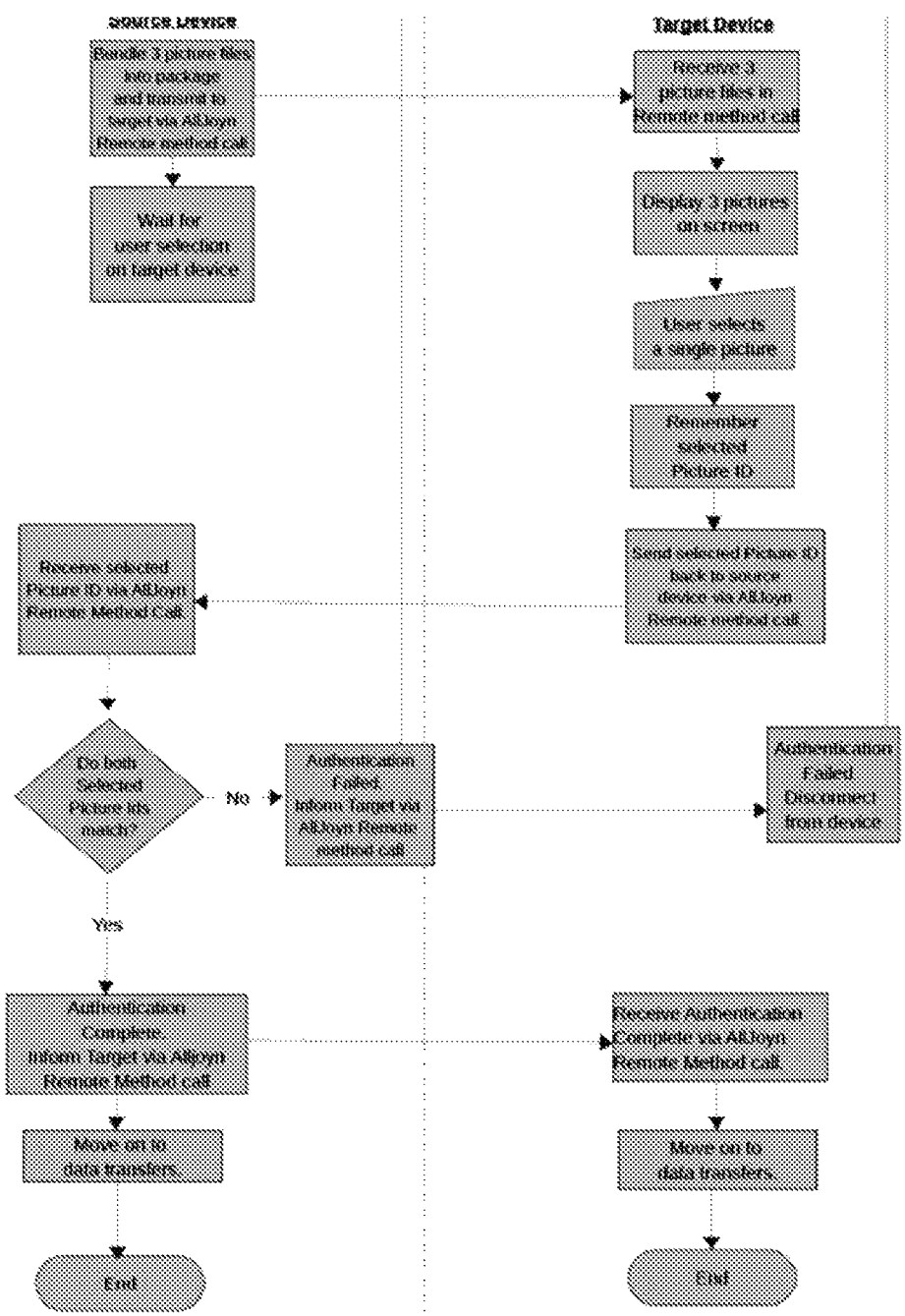

The system and method for secure wireless communication of the present disclosure will now be described with the help of accompanying drawings, in which:

FIG. 1 illustrates an architectural representation of a system for secure wireless communication in accordance with the present disclosure; and FIGS. 2(a) and 2(b) illustrates a flowchart depicting the steps involved in a method for secure wireless communication in accordance with the present disclosure.

DETAILED DESCRIPTION

Bluetooth networking transmits data via low-power radio waves that provide communication on frequency bands ranging between 2.402 GHz to 2.480 GHz, set aside by an international agreement for the use of Industrial, Scientific And Medical (ISM) devices such as baby monitors, garage openers or new generation cordless telephones. In addition, for pairing of devices using a Bluetooth network, the devices are required to be kept within a proximal range of 10 meters (or 32 feet) only. Typically, one can connect a maximum of eight devices simultaneously at a time using Bluetooth. However the load of multiple devices in a Bluetooth network for data sharing causes network congestion, resulting in the transmitted data packets getting dropped in between transmission.

Thus to overcome these aforementioned limitations, the present disclosure envisages A System and Method for secure Wireless Communication that provides a versatile mechanism for pairing of communication devices via a framework and enables sharing of data using multiple connecting mediums available to the devices.

The system and method of the present disclosure will now be described with reference to the embodiment shown in the accompanying drawings. The embodiment does not limit the scope and ambit of the disclosure. The description relates purely to the examples and preferred embodiments of the disclosed system and its suggested applications.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The system and method for secure wireless communication of the present disclosure is Operating System (OS) independent and can be executed on any device. To accomplish this feature, the device must comply with basic requirements including but not restricted to wireless network access, internet access and display capabilities.

The system and method of the present disclosure enables a device to be paired with at least one another device for the purpose of communication or transferring or sharing data securely. The system and method of the present disclosure enables pairing of two or more devices using pictures or graphics. Pairing of devices using pictures or graphics is independent of type, nature, usage, size, screen, and technology and form factor of devices. Pairing of devices using pictures or graphics makes the system independent of the connecting mediums used for communicating among the devices once paired. On a source device, a set of pictures or graphics are displayed from which a picture is selected either manually by a user or automatically by the system as per the user preference(s) set by the user. The information related to the selected picture such as picture-id, filename and the like are transmitted to a target device. The user interface of the target device displays a set of pictures. Typically, the set of pictures displayed on the target device includes but is not limited to the pictures transmitted by the source device, the pictures already stored in the memory of the target device or a combination of both. On the target device, a particular picture is selected by the user of the target device or automatically by the system, and further transmitted back to the source device. At the source device, the picture received from the target device is matched with the selected picture previously transmitted by the source device. Upon a successful match, the source device transmits an authentication confirmation for the pairing of the source device and the target device.

Referring to FIG. 1, an architectural representation of a system for secure wireless communication in accordance with the present disclosure is illustrated. The system 100 as represented in the aforementioned figure comprises a user interface 110, a replication client 120, a replication engine 130, a picture pairing manager 140, a framework 150, an operating system 160, and a data replication manager 170. Further, the data replication manager 170 includes a contact manager 170A, a calendar manager 170B, a call logs manager 170C, a message manager 170D, an application manager 170E, a photo manager 170F, an audio manager 170G, and a video manager 170H. Once the system 100 is installed in the device(s) and activated, a user is enabled to pair his/her device referred to as the source device with at least one another device of another user referred to as the target device over a wireless network, by enabling the picture pairing manager 140 of the source device to transmit a first handshaking packet having pairing picture(s) therein to the target device over wireless network access via the framework 150. Typically, the picture pairing manager 140 is enabled to transmit one or more than one pictures to the target device. Typically, the first handshaking packet transmitted from the source device to the target device for the purpose of pairing includes but is not limited to a picture-id of the picture(s) selected by the user, a universally unique identifier (UUID) of the source device, and the picture(s).

The picture pairing manager 140 of the target device receives the first handshaking packet from the source device and further transmits a second handshaking packet to the source device via the framework 150 over the wireless network. The picture pairing manager 140 of the target device extracts the pictures from the first handshaking packet and displays the pictures from the first handshaking packet, the pictures already stored in a memory of the target device or a combination of both and enables a user of the target device to select at least one picture. The second handshaking packet comprises a picture-id of the picture(s) selected by the user of the target device, a universally unique identifier (UUID) of the target device, and the picture(s).

The picture pairing manager 140 of the source device receives the second handshaking packet transmitted by the target device and authenticates the second handshaking packet. Typically, the authentication is done by matching the picture-id, the UUID, and the picture(s) of the second handshaking packet received from the target device with that of the first handshaking packet transmitted by the source device. If the picture-id, the UUID, and the picture(s) of the second handshaking packet are successfully matched with the picture-id, the UUID, and the picture(s) of the first handshaking packet, the picture pairing manager 140 of the source device authenticates the target device and transmits an authentication confirmation packet to the target device over the wireless network via the framework 150, and an authentication-complete message is displayed on the user interface 110 of the target device. Typically, the authentication confirmation packet is transmitted within a pre-determined time period. In accordance with one exemplary embodiment the authentication confirmation packet is transmitted within three seconds. In addition, the picture pairing manager 140 of the source device summons the replication engine 130 and prepares the replication engine 130 for data transmission. The replication engine 130 cooperates with the data replication manager 170 for transmitting the desired data from the source device to the target device. The replication engine 130 interfaces with the framework 150 and builds up data to be transmitted to the target device. Typically, the replication engine 130 converts the pictures(s) into a format suitable for transmission.

At the target device, the picture pairing manager 140 receives the authentication confirmation packet within the pre-determined time period transmitted from the source device and further summons the replication client 120. In accordance with one exemplary embodiment, the picture pairing manager 140 receives the authentication confirmation packet within three seconds. The replication client 120 represents the signal interface between the user interface 110 and the replication engine 130. The replication client 120 prepares itself for receiving the data transmitted or shared by the replication engine 130 of the source device. In addition, the replication client 120 of the target device cooperates with the data replication manager 170 of the target device for storing the received data shared or transmitted from the source device. If the target device does not receive the authentication confirmation packet within the pre-determined time period from the source device, an authentication-fail message is displayed on the user interface 110 of the target device.

Further, if the matching of the picture-id, the UUID, and the picture(s) present in the second handshaking packet with that of the first handshaking packet is unsuccessful, an authentication-fail message is displayed on the user interface 110 of the source device.

Typically, some of the responsibilities of the picture pairing manager 150 include:
  deciding which pictures to appear on the user interface of the source device;
  storing the picture-id of the selected picture on the source device;
  storing the picture-id of the selected picture on the target device;
  storing details of both the source device and target device in the pairing transaction;
  determining a successful/unsuccessful pairing transaction;
  indicating the display message to be displayed to the user interface.

The framework 150 used for transmitting and receiving handshaking packet(s) over the network between the source device and the target device, provides a universal communication framework and a core set of system-services that enable interoperability among the connected or paired devices, assists in establishing a dynamic proximal network(s) of connected or paired devices, and enable users to discover and engage with other devices on the wireless network using standard communication protocols such as UDP and TCP protocols. In accordance with one exemplary embodiment, the framework is AllJoyn framework.

The user interface 110 enables users to pair the desired devices manually and enables users to read messages. Typically, operating system 160 enables in executing the system 100 on the desired devices.

Typically, the user interface 110, the replication client 120, the replication engine 130, the picture pairing manager 140, the framework 150, the operating system 160, and the data replication manager 170 are implemented in the source device by a first processor of the source device and in the target device by a second processor of the target device.

Referring to FIGS. 2(*a*) and 2(*b*), a flowchart depicting the steps involved in a method for secure wireless communication, in accordance with the present disclosure is illustrated. The method for secure wireless communication as illustrated in FIGS. 2(*a*) and 2(*b*) comprises the following steps:
  establishing connection of a source device to a wireless network through a framework and establishing connection of at least one target device to the wireless network through the framework;

broadcasting a universally unique identifier (UUID) of the source device and a universally unique identifier (UUID) of the target device on the wireless network through the framework; and
  waiting, at the target device, for the establishment of connection with the source device;
searching for universally unique identifiers (UUIDs) of a plurality of devices including the UUID of the target device on the wireless network in the vicinity of the source device through the framework;
displaying the UUIDs of the plurality of devices on the wireless network in the vicinity of the source device on a display unit of the source device;
establishing connection between the source device and the target device on the wireless network through the framework, if the target device is in the vicinity of the source device; and
  awaiting authentication at the target device and displaying a message indicative of the awaited authentication on a display unit of the target device;
loading a plurality of pictures from an external memory into a memory of the source device;
representing a file name of each picture as a picture-id of each picture;
displaying the pictures on the display unit of the source device;
selecting at least one picture from the displayed pictures at the source device;
storing the picture-id of the selected picture into the memory of the source device;
transmitting a handshaking packet having the pictures including the picture selected at the source device, a picture-id of each picture including the selected picture, and the universally unique identifier (UUID) of the source device, from the source device to the target device over the wireless network through the framework; and
  waiting for the picture-id of the picture selected at the target device;
receiving the handshaking packet at the target device;
extracting the pictures from the handshaking packet and displaying the pictures on the display unit of the target device;
selecting at least one picture from the displayed pictures at the target device;
storing the picture-id of the selected picture into a memory of the target device;
transmitting a handshaking packet comprising at least a picture-id of the picture selected at the target device from the target device to the source device over the wireless network through the framework;
receiving at the source device, the picture-id of the picture selected at the target device;
comparing the picture-id of the picture selected at the source device with the picture-id of the picture selected at the target device, including:
  authenticating the target device if the picture-id of the picture selected at the source device matches with the picture-id of the picture selected at the target device; including,
    transmitting, within a pre-determined time period, a message from the source device informing the target device of successful authentication;
    receiving, within the pre-determined time period, at the target device the message of successful authentication;
  or
  rejecting the target device if the picture-id of the picture selected at the source wireless device does not match with the picture-id of the picture selected at the target device; including,
    transmitting, within a pre-determined time period, a message from the source device informing the target device of failed authentication;
    receiving, within the pre-determined time period, at the target the message of failed authentication and disconnecting the target device from the source device;
    awaiting authentication at the target device and displaying a message indicative of the awaited authentication on a display unit of the target device;
transferring data between the source device and the target device over the network if the authentication is successful.

At the source device, the system loads a list of pictures along with their respective picture-id and displays the pictures on the display unit of the source device. A particular picture from the loaded list of pictures can be selected manually by the user or can be selected automatically by the system. Typically, the loaded list includes but is not limited to three pictures.

The process of pairing of one or more devices can be done either manually by the user or automatically by the system installed on the device(s) as per the preference(s) set by the user on his/her device(s).

The system and method for secure wireless communication supports peer-peer transfer of data or information from one device to another device. Pairing of devices using pictures or graphics ensures secure transmission of data to the intended device(s) only. The system and method of the present disclosure enables sharing or transmission of data on cross-platforms, for example, sharing of data between a device operating on iOS platform and another device operating on a Andriod platform.

The system and method for pairing communication devices enables users, who are unable to understand alphanumeric codes due to some medical condition or illiteracy, to remember pictures or images easily. The system and method for secure wireless communication of the present disclosure provides a niche platform for users to share or transfer data and facilitates communication in a secure manner Technical Advancements and Economic Significance The technical advancements of the system and method envisaged by the present disclosure include the realization of:
  a system for secure wireless communication which is easy to install and easy to operate;
  a system for secure wireless communication which requires considerably less time to perform its operation;
  a method for secure wireless communication which could be performed by people of all age groups;
  a system and method for secure wireless communication which is reliable;
  a system and method for secure wireless communication which can be universally applied across different platforms and different operating systems;
  a system for secure wireless communication which works across different makes of devices;
  a system and method for secure wireless communication which experiences minimum errors;

a system for secure wireless communication which consumes less power and fewer resources;

a method for secure wireless communication which can be performed by people with medical conditions;

a method for secure wireless communication which can be performed by people with illiteracy and/or language barriers;

a system for secure wireless communication over large operating distances;

system for secure wireless communication which works on portable and non-portable devices;

a system for secure wireless communication which can perform its functions with minimal human interaction;

a system for secure wireless communication which can operate across multiple devices.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for secure wireless communication, comprising:

establishing connection of a source wireless network device to a wireless network through a framework and establishing connection of at least one target wireless network device to the wireless network through the framework;

broadcasting a universally unique identifier (UUID) of the source wireless network device and UUID(s) of the target wireless network device(s) on the wireless network through the framework;

searching for UUIDs of a plurality of wireless network devices including the UUID(s) of the target wireless network device(s) on the wireless network in the vicinity of the source wireless network device through the framework;

displaying the UUIDs of the plurality of wireless network devices on the wireless network in the vicinity of the source wireless network device on a display unit of the source wireless network device;

establishing connection between the source wireless network device and the target wireless network device(s) on the wireless network through the framework;

loading a plurality of pictures from an external memory into a memory of the source wireless network device;

representing a file name of each picture as an identification of each picture;

displaying the plurality of pictures on the display unit of the source wireless network device;

selecting at least one picture from the displayed pictures at the source wireless network device;

transmitting a handshaking packet comprising the plurality of pictures, the identification of each picture, and the UUID of the source wireless network device, from the source wireless network device to the target wireless network device(s) over the wireless work through the framework;

receiving the handshaking packet at the target wireless network device(s);

extracting the plurality of pictures from the handshaking packet and displaying the pictures on a display unit of target wireless network device(s);

selecting at least one picture from the displayed pictures at each of the target wireless network device(s); and transmitting a handshaking packet comprising at least an identification of the picture selected at each of the target wireless network device(s) from each of the target wireless network device(s) to the source wireless network device over the wireless network through the framework.

2. The method of claim 1, further comprising receiving at the source wireless network device, the identification of the picture selected at one or more of the target wireless network device(s).

3. The method of claim 1, further comprising receiving at the source wireless network device, the identification of the picture selected at each of the target wireless network device(s).

4. The method of claim 3, further comprising comparing with a processor of the source wireless network device the identification of the picture selected at the source wireless network device with the identification of the picture selected at one or more of the target wireless network device(s).

5. The method of claim 3, further comprising comparing with a processor of the source wireless network device the identification of the picture selected at the source wireless network device with the identification of the picture selected at each of the target wireless network device(s).

6. The method of claim 5, further comprising authenticating the target wireless network device(s).

7. The method of claim 5, further comprising authenticating the target wireless network device(s) in the event that the identification of the picture selected at the source wireless network device matches with the identification of the picture selected at the target wireless network device(s).

8. The method of claim 7, further comprising rejecting the target wireless network device(s) in the event that the identification of the picture selected at the source wireless network device does not match with the identification of the picture selected at the target wireless network device.

9. The method of claim 8, further comprising transferring data between the source wireless network device and the target wireless network device(s) over the wireless network in the event that the authentication is successful.

10. The method of claim 9, further comprising storing the identification of the selected picture into the memory of the source wireless network device, after the step of selecting at least one picture from the displayed pictures at the source wireless network device.

11. The method of claim 10, further comprising the step of storing the identification of the selected picture into a memory of each of the target wireless network device(s) after the step of selecting at least one picture from the displayed pictures at each of the target wireless network device(s).

12. The method of claim 11, wherein the step of authenticating the target wireless network device(s) in the event that the identification of the picture selected at the source wireless network device matches with the identification of the picture selected at the target wireless device(s), further comprises transmitting a message from the source wireless network device informing the target wireless network device(s) of successful authentication.

13. The method of claim 12 further comprising receiving at the target wireless network device(s) the message of successful authentication.

14. The method as claimed in 10, wherein the step of rejecting the target wireless network device(s) in the event that the identification of the picture selected at the source wireless network device does not match with the identification of the picture selected at the target wireless network device(s), includes the step of transmitting a message from the source wireless network device informing the target wireless network device(s) of failed authentication.

15. The method of claim 14, further comprising receiving at the target wireless network device(s) the message of failed authentication and disconnecting the target wireless network device(s) from the source wireless network device.

16. The method of claim 15, further comprising awaiting authentication at the target wireless network device(s) and displaying a message indicative of the awaited authentication on the display unit of the target wireless network device(s).

17. The method of claim 16, further comprising disconnecting the target wireless network device(s) from the source wireless network device in the event of not receiving the message of either successful authentication or failed authentication at the target wireless network device(s) within a pre-determined time period.

18. The method of claim 17, further comprising awaiting authentication at the target wireless network device(s) and displaying a message indicative of the awaited authentication on the display unit of the target wireless network device(s).

19. The method of claim 10, further comprising the step of storing the identification of the selected picture into a memory of one or more of the target wireless network device(s).

20. The method of claim 10, further comprising the step of storing the identification of the selected picture into a memory of one or more of the target wireless network device(s) after the step of selecting at least one picture from the displayed pictures at one or more of the target wireless network device(s).

* * * * *